United States Patent [19]

Hayasaka

[11] 4,364,630
[45] Dec. 21, 1982

[54] AUTOMATIC FOCUSING DEVICE FOR MICROSCOPES

[75] Inventor: Toshimi Hayasaka, Hachiouji, Japan
[73] Assignee: Olympus Optical Co., Ltd., Tokyo, Japan
[21] Appl. No.: 203,224
[22] Filed: Oct. 31, 1980

[30] Foreign Application Priority Data

Nov. 6, 1979 [JP] Japan .......................... 54-153246[U]

[51] Int. Cl.³ .............................................. G02B 7/11
[52] U.S. Cl. .................................... 350/518; 350/255; 350/521
[58] Field of Search ...................... 350/46, 76, 77, 90, 350/255

[56] References Cited

U.S. PATENT DOCUMENTS

| | | | |
|---|---|---|---|
| 3,519,334 | 7/1970 | Heitmann et al. | 350/255 |
| 3,984,678 | 10/1976 | Uchiyama et al. | 350/46 X |
| 4,030,815 | 6/1977 | Andrevski et al. | 350/255 |
| 4,153,341 | 5/1979 | Kawamura et al. | 350/255 |

FOREIGN PATENT DOCUMENTS 2207107  8/1973  Fed. Rep. of Germany ........ 350/46
50-132937 10/1975 Japan.

OTHER PUBLICATIONS

Figler, "Precision Focus Control," *Proc. Soc. Photo-Optical Instru. Engrs.*, SPIE, vol. 141, pp. 43-44, 1978.

*Primary Examiner*—John K. Corbin
*Assistant Examiner*—Matthew W. Koren
*Attorney, Agent, or Firm*—Cushman, Darby & Cushman

[57] ABSTRACT

An automatic focusing device for microscopes comprising nozzles arranged around the individual objective lenses, a gas feed pipe attached to the arm or the similar member of the microscope, and a coupler arranged in or near the objective lens switching device and used for connecting said gas feed tube to said nozzle, said automatic focusing device being adapted in such a manner that when objective lenses are switched from one to another to be used for microscopy by rotating said objective lens switching device, the nozzle arranged around the objective lens to be used for microscopy is connected to said gas feed tube, whereby the gas supplied through said gas feed tube passes through said coupler and is injected from said nozzle for focusing the objective lens to be used for microscopy.

9 Claims, 3 Drawing Figures

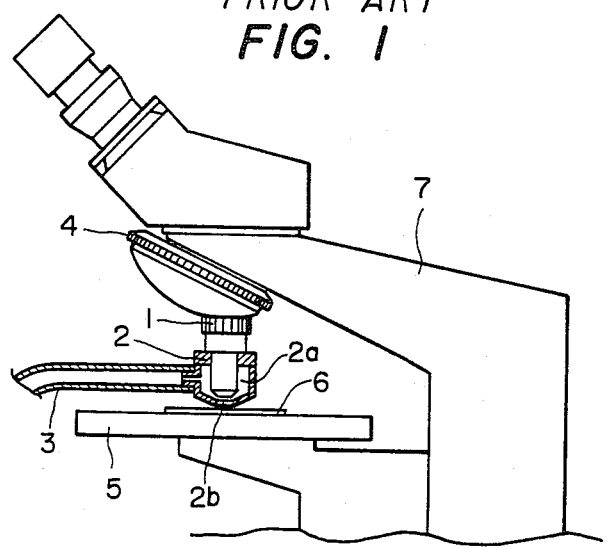
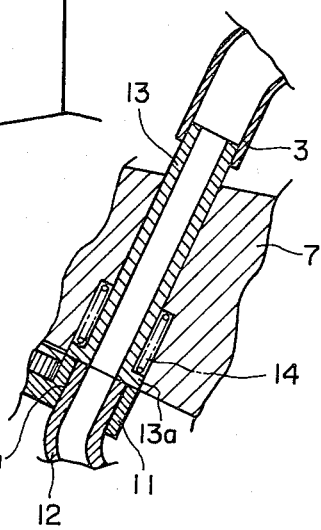
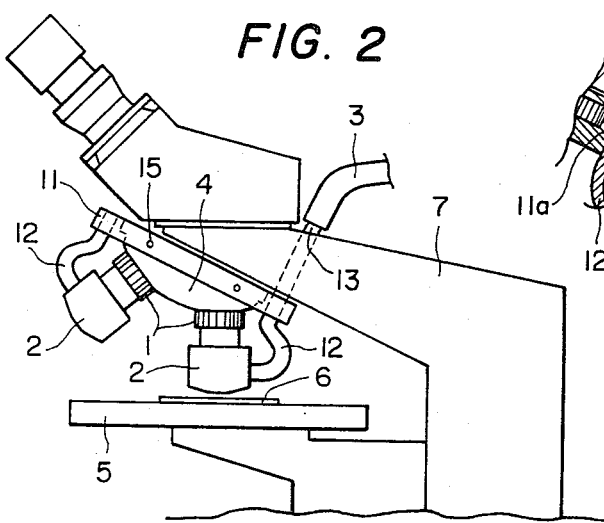

AUTOMATIC FOCUSING DEVICE FOR MICROSCOPES

BACKGROUND OF THE INVENTION (a) Field of the Invention

The present invention relates to an automatic focusing device for microscopes utilizing gas such as air.

(b) Description of the Prior Art

As an automatic focusing device for microscopes utilizing gas, there have already known the one disclosed by Japanese published unexamined patent application No. 13293/75. This automatic focusing device is so designed as to inject a gas out of a nozzle fixed to an objective lens of a microscope or formed integrally therewith toward the surface of a specimen and focus the objective lens by moving the objective lens or stage vertically in accordance with pressure of the gas. Speaking more concretely, the automatic focusing device has the construction shown in FIG. 1 in which a microscope tube nozzle 2 is arranged around an objective lens 1 and a gas feed tube 3 is connected to the tube nozzle. The reference numeral 4 represents a revolver, the reference numeral 5 designates a stage and the reference numeral 7 denotes an arm. In the automatic focusing device having such a construction, gas is fed through the gas feed tube 3 into the tube nozzle 2 so that gas passes through space 2a reserved in the tube nozzle 2 and is injected from tip 2b of the nozzle toward the surface of a specimen 6. Pressure of the gas injected in this way is measured with a detector attached to the gas feed tube 3 or the similar member and the objective lens or stage is moved vertically in accordance with the difference between the measured value and a preset value for focusing the objective lens. In case of a microscope equipped with a plural number of objective lenses, however, the conventional automatic focusing device had defects that is requires connective gas tubes to the individual objective lenses and the gas tubes causes hindrance to operation of the microscope since the gas tubes are connected directly to the nozzle or microscope tube nozzle. Further, when the automatic focusing device having the construction shown in FIG. 1 is combined with a microscope equipped with a revolver type objective lens switching device, the individual gas feed tubes are tangled with one another by operating the objective lens switching device, thereby making it impossible to switch the objective lenses in worse cases. In a case where the automatic focusing device is combined with a microscope using an objective lens switching device, it is required to use a single gas feed tube only and switch the objective lenses through tedious procedures of stopping operation of the automatic focusing device, disconnecting the gas feed tube from the objective lens, switching the objective lenses from one to another and thereafter connecting the gas feed tube to the objective lens to be used for microscopy.

SUMMARY OF THE INVENTION

A general object of the present invention is to provide an automatic focusing device for microscopes comprising nozzles arranged in a number corresponding to individual objective lenses, a gas feed tube attached to an arm, and a coupler which is arranged in the objective lens switching device or in the vicinity thereof and used for selectively connecting said gas feed tubes, said automatic focusing device being so constructed as to connect the nozzle corresponding to the objective lens to be used for microscopy to the gas feed tube through the coupler when the objective lenses are switched from one to another by operating the objective lens switching device, whereby gas supplied through the gas feed tube passes through the coupler and is injected out of the nozzle corresponding to the objective lens to be used for microscopy for focusing the objective lens to be used for microscopy.

BRIEF DESCRIPTION OF THE DRAWINGS

FIG. 1 shows a side view with a partial section illustrating a portion of a microscope equipped with the conventional automatic focusing device utilizing gas pressure;

FIG. 2 shows a side view illustrating a microscope equipped with the automatic focusing device according to the present invention; and FIG. 3 shows a sectional view illustrating more details of arrangement of the gas feed tube used in the automatic focusing device according to the present invention.

DETAILED DESCRIPTION OF THE PREFERRED EMBODIMENT

A microscope equipped with the automatic focusing device according to the present invention is shown in FIG. 2 wherein the reference numeral 1 represents objective lenses, the reference numeral 2 designates microscope tube nozzles, the reference numeral 3 denotes a gas feed tube, the reference numeral 4 represents a revolver, the reference numeral 5 designates a stage, the reference numeral 6 denotes a specimen and the reference numeral 7 represents an arm, all of these members being substantially the same as those illustrated in FIG. 1. The reference numeral 11 designates a tube coupling ring which is secured to the revolver 4 by a suitable fixing means such as screw 15 and in which communicating slots 11a are formed in a number equal to that of the objective lenses attached to the revolver 4. The reference numeral 12 represents tubes for connecting the microscope tube nozzles 2 of the respective objective lenses to the communicating slots 11a, and the reference numerals 13 designate a gas feed pipe arranged through the arm 7, one end of said feed pipe being connected to the gas feed tube and the other end of said gas feed pipe being connected to the communicating slot 11a formed in the ring 11. The portion in which said gas feed pipe is formed has such a construction as shown in FIG. 3. Speaking concretely, a collar 13a is formed at the tip of the gas feed pipe and a spring 14 is arranged between the gas feed pipe 13 and the arm is the vicinity of said collar 13a, whereby the tip of the gas feed pipe 13 on the side of said collar 13a is always kept in close contact with the top surface (the surface on the side of the arm) of the ring 11.

Now, functions of the automatic focusing device having the above-described construction according to the present invention will be described below. When the microscope equipped with the automatic focusing device according to the present invention is set in the condition shown in FIG. 2, the microscope tube nozzle 2 of the objective lens facing the specimen 6, i.e., the objective lens placed in the optical path is connected to the gas feed pipe 13 by way of the tube 12 and communicating slot 11a of the ring 11. When a gas is supplied through the gas feed tube 3 in this condition, the gas passes through the gas feed pipe 13 and tube 12 into the microscope tube nozzle 2, and then is injected from the nozzle tip 2b toward the surface of the specimen 6. Since pressure of the gas is dependent on the distance between the tip of the microscope tube nozzle and the surface of the specimen 6, the objective lens is focused automatically by comparing the gas pressure with a preset value to determine the pressure difference and moving the objective lens or stage vertically in accordance with the pressure difference thus determined in the same procedures as the conventional procedures already described at the beginning of this specification. When the revolver 4 is rotated to use another objective lens for microscopy, the connecting ring 11 is rotated together with the revolver, and the communicating slot 11a of the ring 11 is deviated from the tip of the gas feed pipe 13. At this stage, since the end surface of the gas feed pipe is compressed onto the top end surface of the connecting ring 11 under force of the spring 14, gas feeding through the gas feed tube 3 into the microscope tube nozzle 2 is stopped. Therefore, pressure increases in the gas feed tube and the automatic focusing device is actuated to raise the objective lens or lower the stage. Further, when the revolver is rotated until an objective lens to be used for microscopy faces the specimen, the communicating slot corresponding to the objective lens among the communicating slots 11a of the ring 11 is connected to the gas feed pipe 13. Therefore, the gas supplied through the gas feed tube 3 passes through the gas feed pipe 13, communicating slot 11a and tube 12, and is fed into the microscope tube nozzle of the objective lens to be used for microscopy to be injected from the tip thereof. Accordingly, the pressure in the gas feed tube is reduced and the automatic focusing device is actuated as described above to raise the stage from its lower position (or lower the objective lens from its higher position) for bringing the objective lens in focus.

Though the tube connecting ring is fixed to the revolver in the embodiment described above, it is possible to design the ring as a member made integral with the revolver. Further, the objective lens switching device is not limited to the revolver type only, and may be a different type such as a slide type. Moreover, the location of the gas feed pipe is not limited to the arm but may be selected at the microscope tube or nearby member other than the arm.

As is understood from the foregoing descriptions, the automatic focusing device for microscopes according to the present invention uses a single gas feed tube and eliminates the necessity to reconnect the gas feed tube in switching objective lenses from one to another to be selected for microscopy. Further, the automatic focusing device for microscopes according to the present invention makes it possible to arrange the gas feed tube at a location causing no hindrance to operation of the microscope. Therefore, operability is remarkably improved for the microscope equipped with the automatic focusing device according to the present invention. Furthermore, since the tube for connecting the communicating slot of the connecting ring to the microscope tube nozzle can be formed integrally with each of the objective lenses, said tube causes no hindrance to operation of the microscope. Therefore, the microscope equipped with the automatic focusing device according to the present invention permits switching objective lenses from one to another in the same procedure as that for an ordinary microscope equipped with no such a device, and automatically focusing the objective lens to be used for microscopy simply by switching the objective lenses. At the step at which the objective lenses are switched from one to another, there is no fear to strike the objective lenses against the specimen since the stage is lowered (or the objective lenses are raised). Moreover, the objective lenses equipped with nozzles which have been used with the conventional automatic focusing devices utilizing gas pressure can be employed for the automatic focusing device according to the present invention with no modification. That is to say, the nozzles may be respectively arranged and fixed beside the objective lenses.

I claim:

1. An automatic focusing device comprising a rotatable objective lens switching device equipped with a plural number of objective lenses, nozzles respectively arranged in the vicinity of said objective lenses and couplers respectively connected to said nozzles; and a gas feed tube connectable to any one of said nozzles through said any one of said couplers to supply gas into said any one of said nozzles thereby to focus, said automatic focusing device being adapted in such a manner that when one of the objective lenses is switched to another to be used for microscopy by rotating said objective lens switching device, said gas feed tube is connected to said any one of said nozzles, arranged in the vicinity of any one of said objective lenses to be used for microscopy through any one of said couplers, whereby the gas supplied through said gas feed tube passes through said any one of said couplers and is injected from said any one of said nozzles arranged in the vicinity of any one of said objective lenses to be used for microscopy to bring said any one of said objective lenses to be used for microscopy in focus condition.

2. An automatic focusing device for microscopes according to claim 1 wherein said nozzles are microscope tube nozzles respectively arranged around said objective lenses.

3. An automatic focusing device for microscopes according to claim 2 wherein each of said couplers is connected to each of said microscope tube nozzles through each of additional tubes.

4. An automatic focusing device for microscopes according to claim 1 wherein said nozzles are respectively arranged and fixed beside said objective lenses.

5. An automatic focusing device for microscopes according to claim 1 wherein said objective lens switching device is a revolver and said couplers are formed respectively in the tube coupling ring attached to said revolver.

6. An automatic focusing device for microscopes according to claim 5 further comprising a gas feed pipe arranged in an arm of the microscope supporting thereon said objective lens switching device, one end of said pipe being connected to said gas feed tube and the other end face compressed onto the surface of said tube coupling ring to enable the other end to connect to any one of said couplers.

7. An automatic focusing device for microscopes according to claim 5 wherein said tube coupling ring is formed integrally with said revolver.

8. An automatic focusing device for microscopes according to claim 1 further comprising a gas feed pipe attached to an arm of the microscope, supporting thereon said objective lens switching device, one end of said pipe being connected to said gas feed tube and the other end connectable to any one of said couplers.

9. An automatic focusing device for microscopes according to claim 8 wherein said gas feed pipe is located at a microscope tube.

* * * * *